United States Patent [19]

Hamada et al.

[11] Patent Number: 5,657,248

[45] Date of Patent: Aug. 12, 1997

[54] IMAGE DISPLAY APPARATUS

[75] Inventors: Nagaharu Hamada, Hitachi; Toshiro Kamiuchi, Tokyo; Ikuo Hikawa; Takashi Nakasugi, both of Yokohama; Takashi Azuma, Chigasaki; Chiharu Takayama, Yokohama, all of Japan

[73] Assignee: Hitachi, Ltd., Tokyo, Japan

[21] Appl. No.: 459,835

[22] Filed: Jun. 2, 1995

[30] Foreign Application Priority Data

Jun. 10, 1994 [JP] Japan .................... 6-128719

[51] Int. Cl.$^6$ ............................................. H04N 1/04
[52] U.S. Cl. ...................... 345/112; 348/580; 382/232
[58] Field of Search ..................... 364/514 A; 395/160; 348/580; 382/304; 358/464

[56] References Cited

U.S. PATENT DOCUMENTS

| 4,463,380 | 7/1984 | Hooks, Jr. .................. 348/580 |
| 4,606,066 | 8/1986 | Hata et al. ................. 387/304 |
| 4,821,108 | 4/1989 | Barbagelata et al. ........ 358/464 |
| 4,931,957 | 6/1990 | Takagi et al. . |
| 4,954,969 | 9/1990 | Tsumura ..................... 395/160 |

FOREIGN PATENT DOCUMENTS

| 493668 | 7/1992 | European Pat. Off. . |
| 63-157524 | 6/1988 | Japan . |
| 63-262712 | 10/1988 | Japan . |
| 3-179493 | 8/1991 | Japan . |

OTHER PUBLICATIONS

"Technical guidelines for the exhibition type HDTV still picture disc system", Hi–Vision Promotion Center, Jul. 1991, p. 7, 13, 54.

"Presentation System using High Definition still picture System", The Institute of Television Engineers of Japan, vol. 47, No. 12, pp. 1669–1672, 1993.

"Moving Picture Storage & Display System for Super–High Definition Images", The Institute of Television Engineers of Japan, vol. 47, No. 6, pp. 909–910, 1993.

Primary Examiner—Emanuel T. Voeltz
Assistant Examiner—Thomas Peeso
Attorney, Agent, or Firm—Bardehle, Pagenberg, Dost, Altenburg, Frohwitter, Geissler & Partners

[57] ABSTRACT

An image display apparatus having a computer system and an image processor. The computer system includes: a personal computer having a CPU and a main memory; and input/output apparatuses such as magneto-optical disk drive, image scanner, full color printer, etc. The image processor which commonly uses a system bus of the computer system includes an independent dedicated image bus, a compression/expansion unit, an image memory read/write controller, image memories, and a video processor. Image data which is sent from the magneto-optical disk drive is decoded by the compression/expansion unit and is held in the image memories. The image data of the image memories is transferred to the video processor through a dedicated signal line and is displayed on a large screen projection display.

37 Claims, 8 Drawing Sheets

F I G. 1
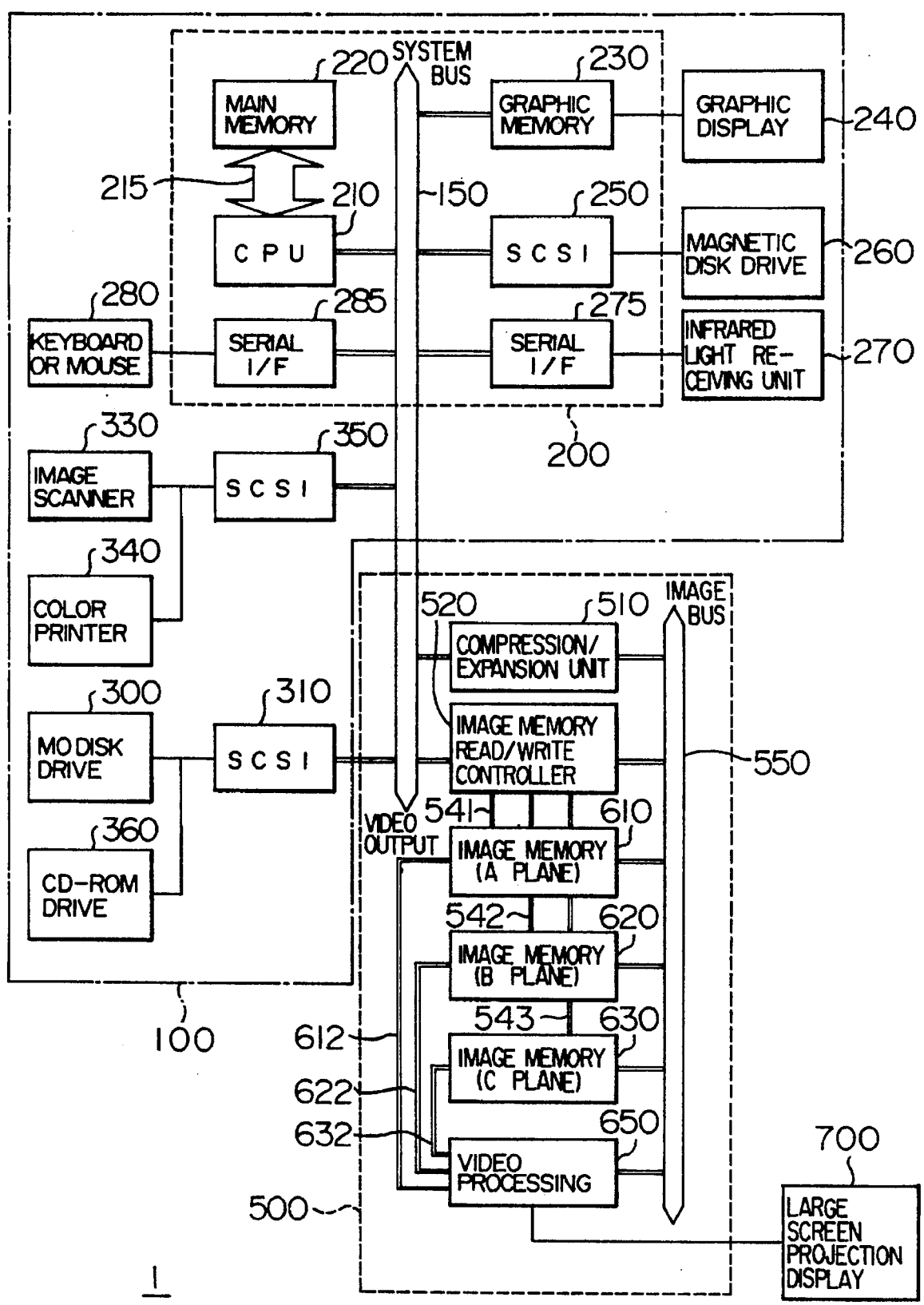

IMAGE DISPLAY APPARATUS

BACKGROUND OF THE INVENTION

The present invention relates to a display apparatus of an image and, more particularly, to a display apparatus of an image suitable for a business such as museum of arts, museum, broadcasting station, publishing company, video production, photographing studio, public relations division of government and public offices and general enterprises, and the like to create, keep, and reuse image data such as photograph, illustration, picture, or the like.

Hitherto, as means for fetching image data such as photograph, picture, or the like into a computer and for reproducing and displaying it as necessary, there were many dedicated apparatuses mainly constructed of a recording medium of a large capacity using a light or magnetism. In recent years, in association with an improvement of a processing ability or display ability of a personal computer (hereinbelow, referred to as a PC), the use of a system in which the PC and a magneto-optical (MO) disk are combined is started. As a prior art of an image display apparatus of the invention, there is a still picture system which is widespread as "Technical guidelines for the exhibition type HDTV still picture disc system (HVC (Hi-Vision Promotion Center) guidelines)", July 1991, pages 7, 13, 14 and 54. According to such a system, still picture data of three display planes (A, B, and C planes) are previously prepared in a memory and a switching operation (dissolve, wipe, or the like) of display planes and a simultaneous display of two display planes, or the like is performed, thereby enabling a presentation effect to be raised. Such an image system is mainly divided to the following two kinds.

(1) Image memory board standard (I/O) bus connecting system

This system is a system which is realized by adding an image memory board in which a processor, a memory, a display controller, and the like adapted to handle image data are installed to an (I/O) expansion slot [standard (I/O) bus] of a PC or workstation. The above system is disclosed in, for example, H. Okamoto et al., "Presentation System using High Definition Still Picture System", The Institute of Television Engineers of Japan, Vol. 47, No. 12, pp. 1669–1672, 1993.

(2) Image memory unit I/O interface connecting system

The system is realized in a manner such that an image data memory unit having therein a processor, a memory, and a display controller which are adapted to handle image data, is housed in an independent or separate casing different from a PC (personal computer) and the memory unit and the PC are connected by a standard I/O interface (RS232-C, SCSI, or the like). The system is, for example, disclosed in O. Tanno et al., "Moving Picture Storage & Display System for Super-High Definition Images", The Institute of Television Engineers of Japan, Vol. 47, No. 6, pp. 909–910, 1993 and JP-A-3-179493.

SUMMARY OF THE INVENTION

Of the above conventional techniques, the image data memory board standard (I/O) bus connecting system of (1) has a problem such that since a data transfer rate (several MB/second) in a PC standard bus is low because compressed image data and its expanded image data are transferred by commonly using the same PC standard bus, a display effect (display plane read-out time <2 seconds, wipe/dissolve time or the like <0.5 second) specified by operation guidelines (HVC guidelines) of the exhibition type HDTV still picture file cannot be realized at a high speed. In the case of the image data memory unit I/O interface connecting system of (2), since the PC (personal computer) and the image data memory unit are installed in different casings, it is necessary to create a dedicated control software in order to make peripheral equipment attached to the image data memory unit operative. In the case where a functional expansion or an improvement of a performance such that a processing speed of the peripheral equipment is raised or the like is accomplished, a dedicated control software has to be formed every time. Since the PC and the image data memory unit are installed in different casings, further, there is a drawback such that a setting occupied area of the hardware increases.

It is an object of the invention to provide an image display apparatus which can solve the above problems.

It is another object of the invention to provide a high speed image display apparatus.

According to one aspect of the invention, an image display apparatus of the invention is made up of a computer which is connected to an input/output bus (system bus) and has a file apparatus to store a plurality of images as compressed digital data, a decoding apparatus to decode the compression data outputted from the file apparatus to an original image, image memories to store at least two display planes of the decoded image from the decoding apparatus, a video processing apparatus for reading out the decoded image from the image memories and converting to a signal for display, and a display apparatus to display an output of the video processing apparatus as a color image.

The compression data from the file apparatus is transmitted to the decoding apparatus through a system bus serving as an I/O bus of the computer, the decoding apparatus transfers the expanded image data to the image memories through the dedicated image data bus, and the display data from the image memory is transferred to the video processing apparatus through a dedicated signal line, thereby displaying an image to a large screen projection display at a high speed.

Preferably, the computer, decoding apparatus, image memories, and video processing apparatus are enclosed in the same casing.

BRIEF DESCRIPTION OF THE DRAWINGS

FIG. 1 is a block diagram showing a system construction of an embodiment of an image display apparatus of the invention;

DESCRIPTION OF THE PREFERRED EMBODIMENTS

Figure 2:
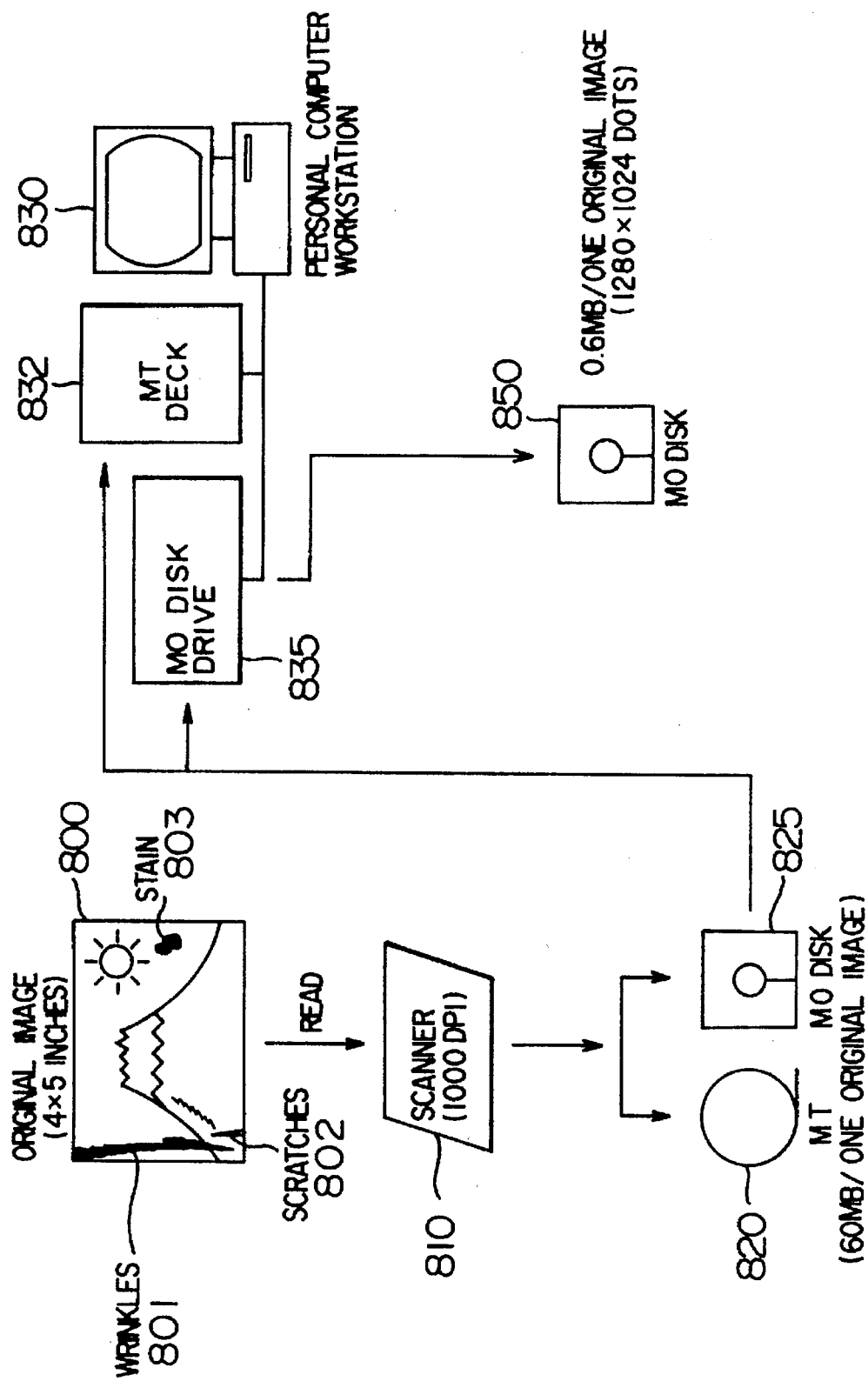
FIG. 2 is a diagram useful for explaining a process of forming image display data.

An embodiment of the invention will now be described hereinbelow with reference to FIGS. 1 to 8. FIG. 1 is a block diagram showing a system construction of an embodiment of an image display apparatus of the invention. The image display apparatus of the invention shown by reference numeral 1 as a whole has a computer system 100 and an image processing unit 500 and displays an image to a large screen projection display 700. The computer system 100 is a computer system having, for example, a workstation, a personal computer of a desk-top type, or other small computer as a computer main body.

As a large screen projection display 700, there is a high definition display having a resolution of (1280×1024) dots, (1600×1200) dots, (1920×1035) dots, or the like. In the embodiment, a display image of the resolution of (1280×1024) dots is subjected to a non-interlace 72 times per second, thereby obtaining a color image having a high definition without flickering. As such a large screen projection display 700, not only a CRT display but also a display of an interlace type can be used so long as the occurrence of flickering is permitted.

A construction of the computer system 100 will now be described hereinbelow.

The computer system 100 has a computer main body 200 made up of, for example, a personal computer and functioning as a central processing unit. The whole computer system 100 is connected by a system bus 150 serving as an I/O bus of the computer. The computer main body 200, I/O interfaces 310 and 350, and the image processing unit 500 are housed in the same casing. Alternatively, it is also possible to use a construction such that the computer main body 200, I/O interfaces 310 and 350, image processing unit 500, a magnetic disk drive 260, a magneto-optical disk drive 300, and a CD-ROM apparatus 360 are housed in the same casing and media necessary for information reproduction by the computer system 100 can be inserted in the same casing.

The computer main body 200 includes a CPU 210 and a main memory 220 which are interconnected through a high speed memory bus 215. The CPU 210 is connected to the system bus 150. A graphic memory 230 which is connected to the system bus 150 stores graphic data and transfers the graphic data to a graphic display 240 (for example, a display of 17 inches) which is connected to the graphic memory 230 through a D/A converter (not shown), thereby displaying the graphic data.

The magnetic disk drive 260 is connected to the system bus 150 through an input/output interface 250.

As input means, the computer main body 200 has a keyboard or mouse 280 which is connected to the system bus 150 through an interface 285. The computer main body further has an infrared light receiving unit 270 to receive a signal from a remote control unit (not shown). The unit 270 is connected to the system bus 150 through an interface 275.

The magneto-optical disk drive 300 supplies image data of a still picture or motion picture recorded on a magneto-optical disk to the system bus 150 through the I/O interface 310.

When the still picture image data recorded on the magneto-optical disk is displayed to the large screen projection display 700, a vocal explanation, music, and the like synchronized with a display plane are outputted, thereby raising a presentation effect. Such audio data is prepared by a CD-ROM and is reproduced by a CD-ROM drive 360. The CD-ROM drive 360 is connected to the system bus 150 through the I/O interface 310 and is controlled. The reproduced audio data is transmitted to an amplifier (not shown) and is outputted from a loud speaker (not shown).

An image scanner 330 which is connected to the system bus 150 through the I/O interface 350 has a resolution of, for example, 400 dpi and is used when image data is inputted from an original picture, which will be described hereinlater. A color printer 340 prints a still picture in a full color (1677 million colors).

Processes for deriving image data from an original image and recording the same into a magneto-optical disk will now be described hereinbelow with reference to FIGS. 2 and 3.

FIG. 2 is an explanatory diagram showing a forming process of image display data which is recorded onto a magneto-optical disk.

An original picture 800 serving as a material is first prepared in a format of a positive film of, for example, (4×5) inches. There is a case where the original picture 800 includes wrinkles 801, scratches 802, a stain 803, and the like. The original picture 800 is inputted by an image scanner 810 having a high resolution and is recorded to a magnetic tape 820 or a magneto-optical disk 825. As an image scanner 810, an image scanner having a resolution of, for example, 1000 dpi is used. Primary data of an image digitized by a capacity of, for example, 60 MB/(one original picture) is recorded in the magnetic tape 820 or magneto-optical disk 825.

The magnetic tape 820 or magneto-optical disk 825 in which the primary data of the image has been recorded is subsequently loaded in a magnetic tape deck 832 or a magneto-optical disk drive 835 of a PC or workstation 830, thereby executing a process of the primary data.

As a process of the primary data, in addition to a compressing process, various kinds of processing softwares such as edge enhancement of the image, color correction, elimination of a dirt or stain on the original picture, and the like can be used in accordance with an improvement of an image quality or a purpose of image display.

As a correcting method, a part of the original image can be changed by a correction such as elimination of, for example, the wrinkles 801, scratches 802, and stain 803, on the original picture 800 or the like.

Secondary data of the image subjected to the above process is recorded in a magneto-optical disk 850. In case of a display plane of, for example, (1280×1024) dots, the secondary data of the image has a capacity of, for example, 0.6 MB/(one original picture), so that it is compressed to 1/100 as compared with the primary data.

Figure 3:
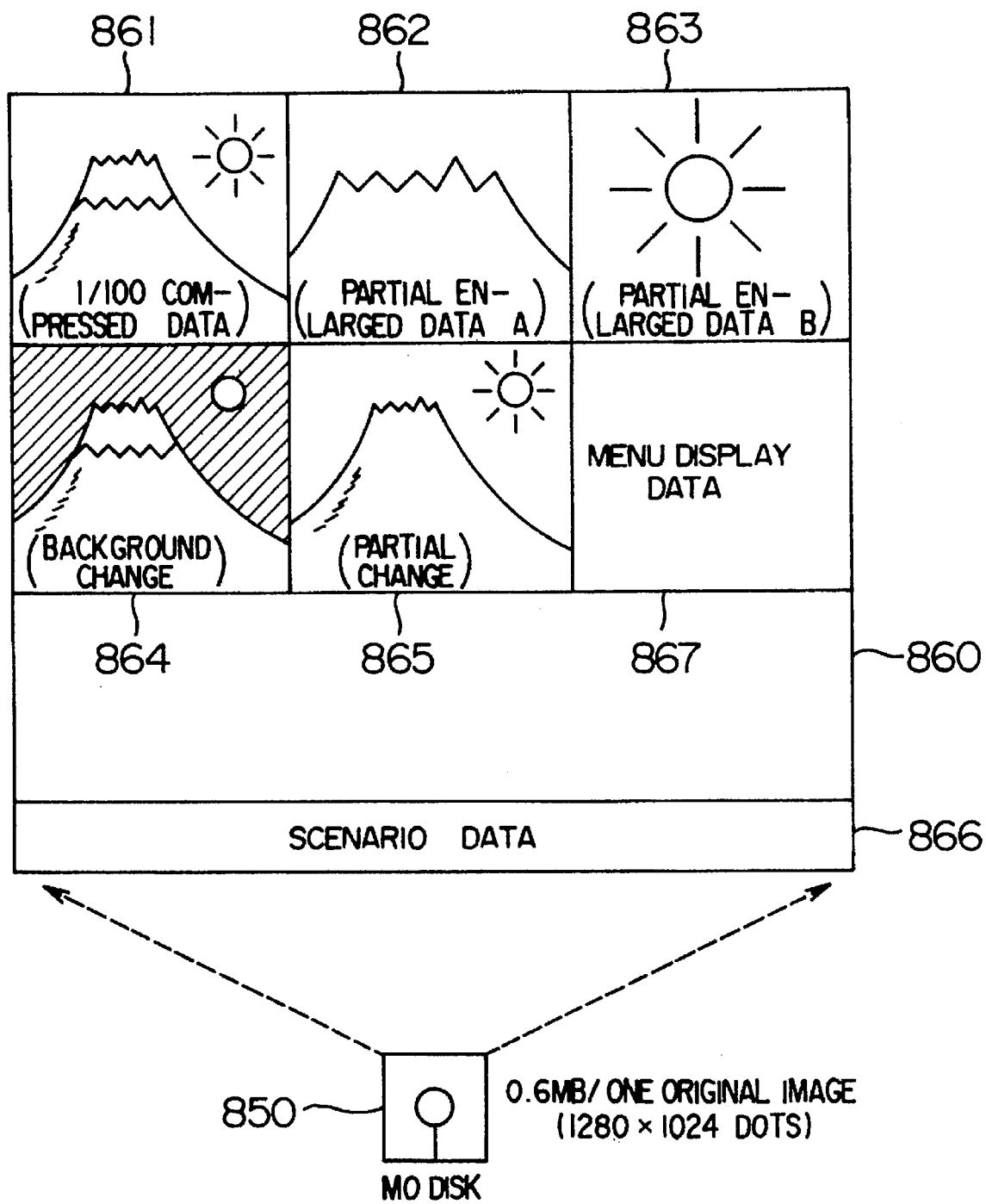
FIG. 3 is a diagram useful for explaining data contents of an image file.

FIG. 3 is an explanatory diagram showing an image file format which is recorded in the magneto-optical disk 850.

Several data obtained by processing the primary data of the original picture is recorded in an image file 860. First image data 861 is data obtained by compressing the primary data to 1/100, second image data 862 is partial enlarged data (A) obtained by enlarging a part of the original picture, and third image data 863 is partial enlarged data (B) obtained by enlarging the other portions of the original picture. Fourth image data 864 is data in which a back color of the original picture was changed and fifth image data 865 is data in which the original picture was partially corrected.

Sixth data 866 is scenario data (control data) and is a control program to determine when the image data or audio data is to be reproduced and how long the reproduction is continued, and, further, to designate its switching method or the like as a reproduction sequence.

Although record lengths of the above image data differ from each other, now assuming that one image data has a capacity of 0.6 MB as an average, about 1000 secondary image data can be stored in one magneto-optical disk having a capacity of 600 MB.

The magneto-optical disk 850 in which the previously processed image data was recorded is loaded to the magneto-optical disk drive 300 of the image display apparatus 1 of the present invention.

An image processing unit as a main component element of the invention will now be described with reference to FIGS. 1, 3, 4, 5, and 8.

The whole operation of the image processing unit 500 surrounded by a broken line in FIG. 1 is controlled by an image processing program 920 (created for the image display apparatus of the invention) stored in the main memory 220 of the computer main body 200. The image processing unit 500 includes a compression/expansion unit 510 and an image memory read/write controller 520 which are connected to the system bus 150.

Figure 8:
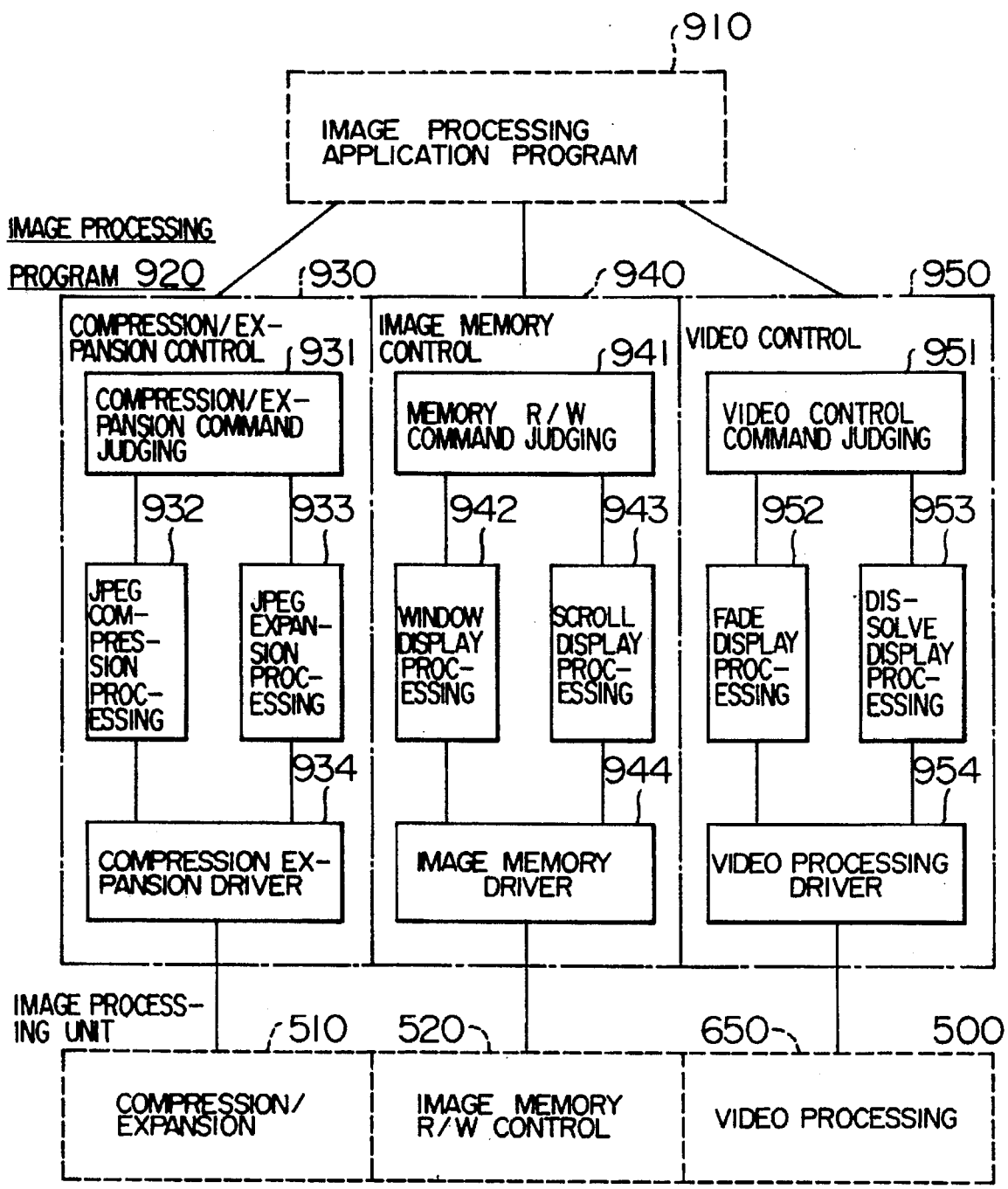
FIG. 8 is a constructional diagram of functions of an image processing program for allowing an image processing unit in FIG. 1 to function.

FIG. 8 is a constructional diagram of functions of the image processing program 920 to allow the image processing unit 500 to function.

The image processing unit 920 is activated by the image processing application program 910 such as reading of image data from an image scanner, processing/recording of the read-out image data, forming/editing/recording of a reproduction scenario by image data and audio data, reproducing/displaying of image/audio by the recording scenario, and the like.

The image processing program 920 is made up of a compression/expansion control section 930, an image memory control section 940, and a video control section 950. Those control sections are constructed of command judging sections 931, 941, 951, processing sections 932 and 933, 942 and 943, and 952 and 953 each for one function, and drivers 934, 944, and 954 for respective hardwares, respectively.

The compression/expansion control section 930 is activated by a request of the process for compression or expansion of the image data from the image processing application program 910. A relevant processing program is selected from the compression/expansion processing modules 932 and 933 by the compression/expansion command judging section 931, thereby driving the compression/expansion unit 510 of the image processing unit 500 through the compression/expansion driver 934.

The image memory control unit 940 is activated by a request to read out or write the image data existing in the image memories 610 to 630 from the image processing application program 910. A relevant processing program is selected from the processing modules 942 and 943 by the memory R/W command judging section 941, there-by driving the image memory R/W controller 520 of the image processing unit 500 through the image memory driver 944.

The video control section 950 is activated by a request for processing the display image data in the video processing unit 650 from the image processing application program 910. A relevant processing program is selected from the processing modules 952 and 953 by the video control command judging section 951, thereby driving the video processing unit 650 of the image processing unit 500 through the video processing driver 954.

The operation of the compression/expansion unit 510 is controlled by the image processing program stored in the main memory 220 of the computer main body 200. The unit 510 has a function to expand the compressed image data recorded in the magneto-optical disk and store in the image memories and a reverse function, namely, a compressing function to record the image data from the image memories in the magneto-optical disk.

With respect to the expanding function, for example, 0.6 MB/(one original picture) is expanded to 3 MB/(one original picture) and, with respect to the compressing function, the reverse holds true.

The compression/expansion unit 510 further has a direct passing function to directly connect the system bus 150 and an image bus 550 without executing the compression/expansion.

The image processing unit 500 is separated from the system bus 150 and has the dedicated image data bus (referred to as an image bus) 550 having a data transfer rate (for example, 60 MB/S which is about two to four times as high as a transfer rate of the system bus 150) which is higher than a data transfer rate (for example, 16 MB/S, 32 MB/S) of the system bus. The compression/expansion unit 510 and image memory read/write controller 520 are connected to the image bus 550.

Three image memories 610, 620, and 630 each constructed of a dual port type video RAM device are connected to the image bus 550. Each of the image memories 610, 620, and 630 has a capacity of 12 MB. For example, in case of a display of (1280×1024) dots/(one display plane), image data of four display planes can be stored by allocating three bytes/one dot. As such image data of four display planes, some of partial pictures obtained by dividing the original picture into four portions may be stored as partial enlarged data as shown in FIG. 3 or a plurality of pictures obtained by dividing an elongated original image such as a hanging picture may be stored.

Figure 4:
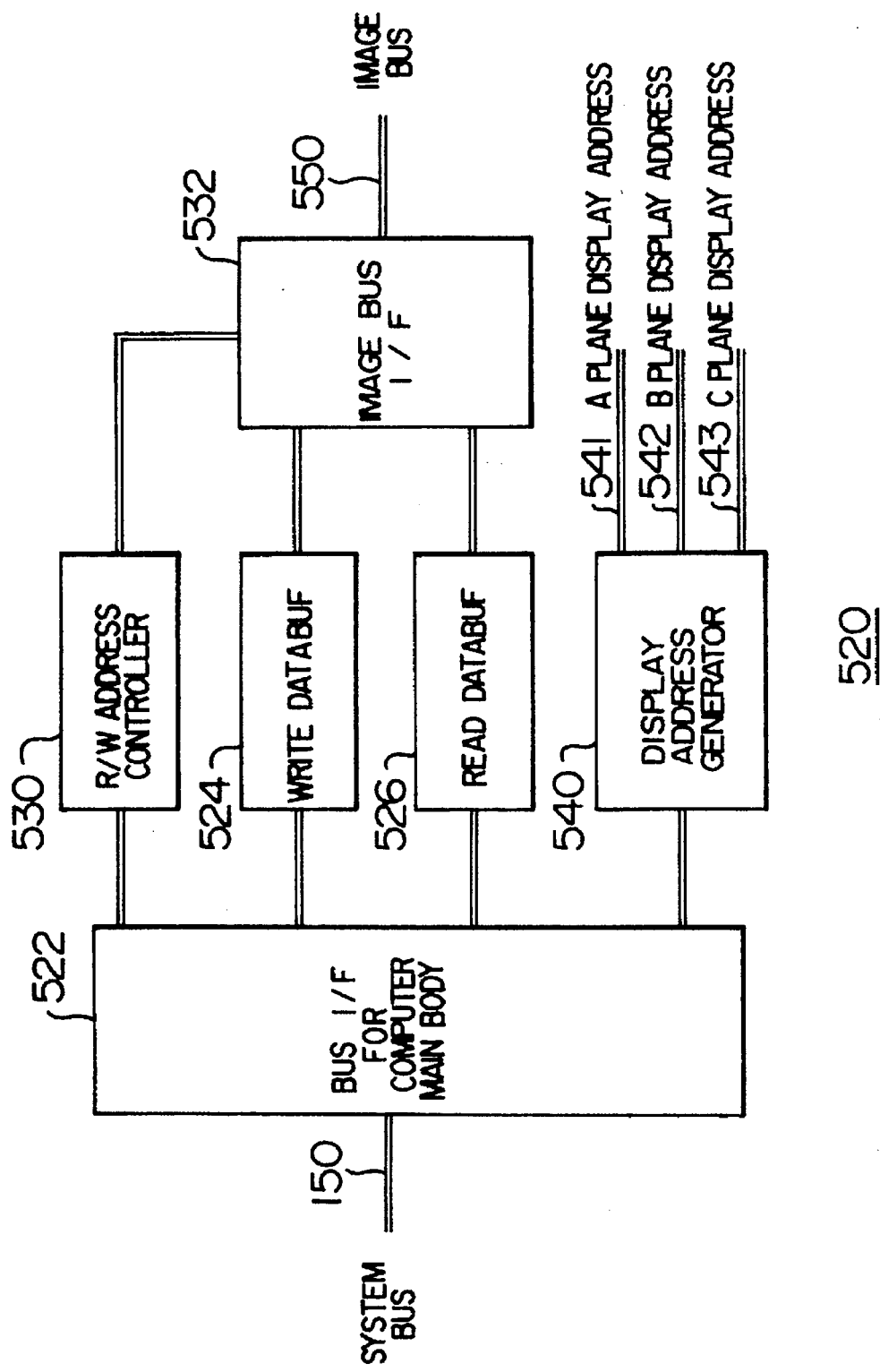
FIG. 4 is a block diagram showing a circuit construction of an image memory read/write controller which is used in the system of FIG. 1.

FIG. 4 is a block diagram showing a specific circuit construction of the image memory read/write controller 520.

The image memory read/write controller 520 has: a PC bus interface 522; a read/write address controller 530; a write data buffer 524; a read data buffer 526; an image bus interface 532; and a display address generator 540.

The operation of the image memory read/write controller 520 is controlled by the image processing program stored in the main memory 220 in the computer main body 200.

The bus interface 522 for the computer main body is connected to the system bus 150. The data in the main memory 220 is outputted to the image bus 550 through the write data buffer 524, image bus interface 532 by means of the image processing program and is stored into the image memories 610, 620, and 630.

The image data read out from the image memories 610, 620, and 630 is supplied to the image bus 550 and image bus interface 532 and is sent to the bus interface 522 for the computer main body through the read data buffer 526. The read data is stored in the main memory 220.

The read/write address controller 530 has a function to continuously generate addresses to read/write for predetermined areas of the image memories 610, 620, and 630. Further, the read/write address controller 530 has an address converter (not shown) (address converting function) for using the image memories 610, 620, and 630 as expansion memories of the main memory 220 of the computer system 100. Namely, by such an address converting function, the image memories 610, 620, and 630 are arranged in the same address space as that of the main memory 220. When using the image memories as expansion memories, memory areas in which no image data is stored in the image memory having a capacity of 36 MBytes as a whole can be effectively used, so that a use efficiency of the image memory is improved and a use efficiency of the whole image display apparatus is improved.

The display address generator 540 has a function of reading out the image data from a predetermined rectangular region of the image data stored in the image memories 610, 620, and 630 and of generating continuous addresses to display. Therefore, by designating a rectangular region, it is possible to display image data extending over a plurality of image plane regions. Further, an arbitrary region of an original image can be window-displayed or can be scroll-displayed. The display addresses are supplied to the image memories 610, 620, and 630 through signal lines 541, 542, and 543.

Figure 5:
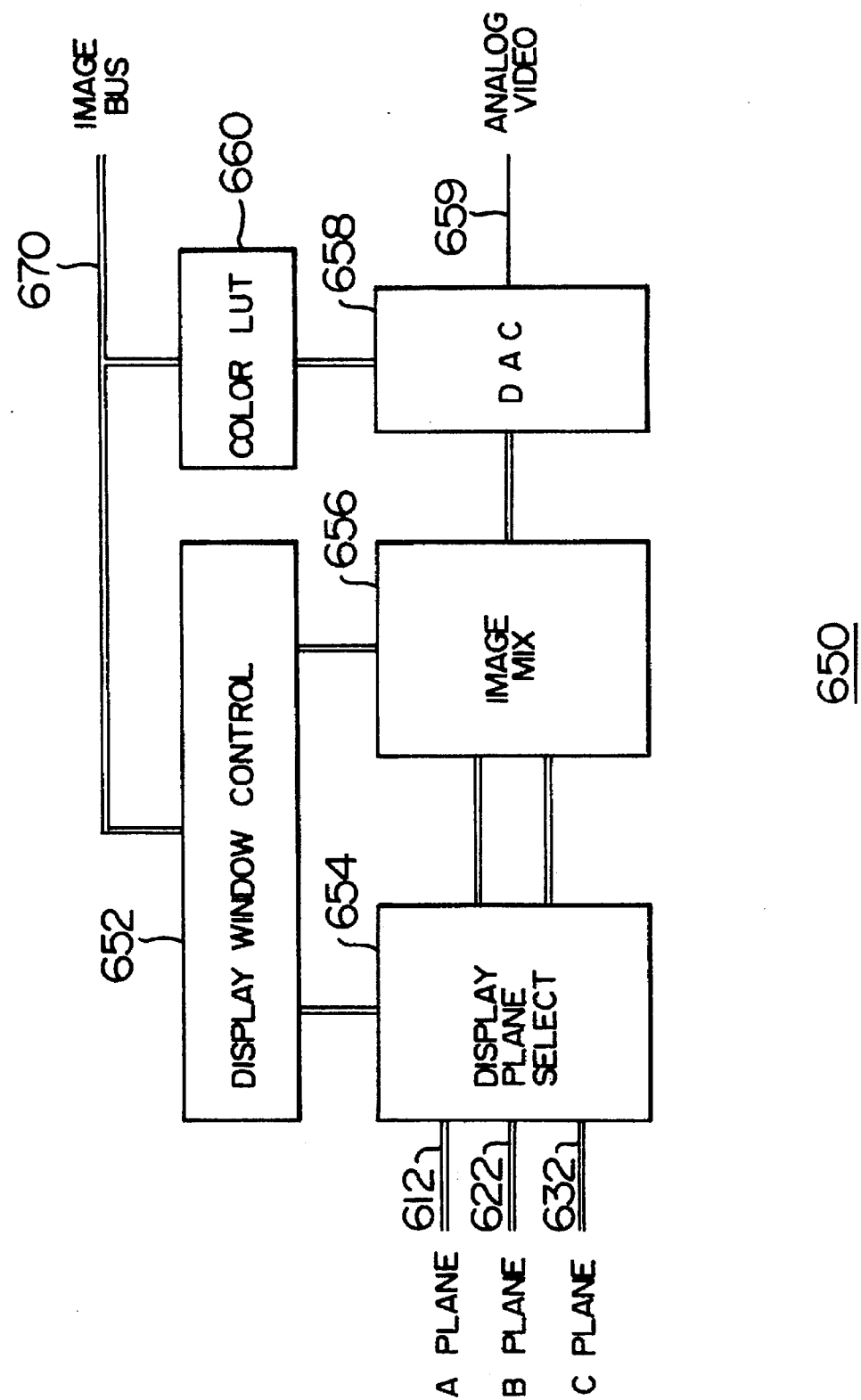
FIG. 5 is a block diagram showing a circuit construction of a video processor which is used in the system of FIG. 1.

FIG. 5 is a block diagram showing a specific circuit construction of the video processor 650.

The video processor 650 has a display window controller 652, a display plane selector 654, an image mixer 656, a D/A converter 658, and a color lookup table (LUT) 660.

The operation of the video processor 650 is controlled by the image processing program stored in the main memory 220 in the computer main body 200.

The image data in the image memories 610, 620, and 630 is transferred to the display plane selector 654 through dedicated signal lines 612, 622, and 632, respectively. The display plane selector 654 selects two display planes from three display planes and transfers as image data P and Q to the image mixer 656. In this instance, the display window controller 652 designates a display region of the display plane by control data 670 which is generated by the image processing program of the computer main body 200 and is sent through the system bus 150, image memory read/write controller 520, and image bus 550. By designating the display region by the display window controller 652, a roll function to continuously switch the display plane can be realized.

The roll function to switch the display plane has been described above. A dissolve function as another display plane switching function will now be described.

The image mixer 656 mixes the image data P and Q which are inputted and forms image data X by the following equation.

$$X = P \cdot \alpha + Q(1-\alpha)$$

The display window controller 652 changes the value of α between 0 and 1 at a timing which is instructed by the control data 670.

The mixed image data X is converted to the analog video signal 659 by the D/A converter 658 and displayed by the large screen projection display 700.

In this instance, in a state in which the value of α is equal to 1, X=P and the image P is displayed. However, when α is decreased from 1 to 0, a luminance of the image P decreases and a luminance of the image Q increases. By such an operation, the image P fades out and the image Q fades in, so that the image is continuously switched and the dissolve function can be accomplished.

The color lookup table 660 sends a color tone parameter of a display color to the D/A converter 658 and accomplishes a full color display of a Good color tone.

The image processing unit 500 as a main component element of the invention has been described in detail above.

The following effects are obtained in cooperation with the computer system 100.

The image memory 610 is connected to the video processor 650 through the dedicated signal line 612. The image memory 620 is connected to the video processor 650 through the dedicated signal line 622. Similarly, the image memory 630 is connected to the video processor 650 through the dedicated signal line 632. For example, each of the signal lines 612, 622, and 632 has a transfer rate of 480 MB/S that is eight times as high as a transfer rate of the image bus 550 and can transfer the data in each of the image memories 610, 620, and 630 to the video processor 650 in parallel with an access from the image bus 550 side.

The video processor 650 converts the digital data of the image which is sent from each image memory to the analog data and displays on the large screen projection display 700.

The above description relates to the case where an image software is previously prepared by another system.

A process to form image data by using the image scanner 330 in FIG. 1 which is provided for the image display apparatus will now be described.

The image scanner 330 inputs the original image supplied and stores into the image memories 610, 620, and 630 through the compression/expansion unit 510. In such a process, the compression/expansion unit 510 allows the image data to pass as it is and does not execute the compression and expansion of the data. The inputted image data is confirmed by the operator on the large screen projection display 700. After that, it is compressed by the compression/expansion unit 510 and is recorded into a magneto-optical disk prepared in the magneto-optical disk drive (MO disk drive) 300 through the system bus 150. The above operation is controlled by the image processing program stored in the main memory 220 in the computer main body 200. On the basis of the image data from the image memories, processes for eliminating wrinkles, scratches, stain, or the like can be performed as necessary by the image processing program. Further, a software compressing function of the image processing program can be also used without using the compressing function of the compression/expansion unit 510. In such a case, the image data from the image memories is allowed to pass through the compression/expansion unit 510 as it is and is sent to the computer main body 200 via the system bus 150. The image data processed by the computer main body 200 is sent to the MO disk drive 300 via the system bus 150. The image data recorded as mentioned above has data contents similar to the data contents of the image file shown in FIG. 3.

The magneto-optical disk formed by the above processes is loaded into the MO disk drive 300, so that the image data is read out from the disk. The image data is transmitted via the interface 310 and system bus 150 which are provided for the computer system 100 and is supplied to the compression/expansion unit 510, image bus 550, image memories 610, 620, and 630, dedicated signal lines 612, 622, and 632, and video processor 650 which are provided for the image processing unit 500. The image data is displayed on the large screen projection display 700.

In the above-described embodiment, image data and scenario data (control data) are recorded in a magneto-optical disk. Alternatively, image data and scenario data (control data) may be recorded in a CD-ROM and read out from the CD-ROM drive 360. Further, the image data and scenario data (control data) recorded in the magneto-optical disk may be copied into the magnetic disk 260 and read from the magnetic disk 260.

Figure 6:
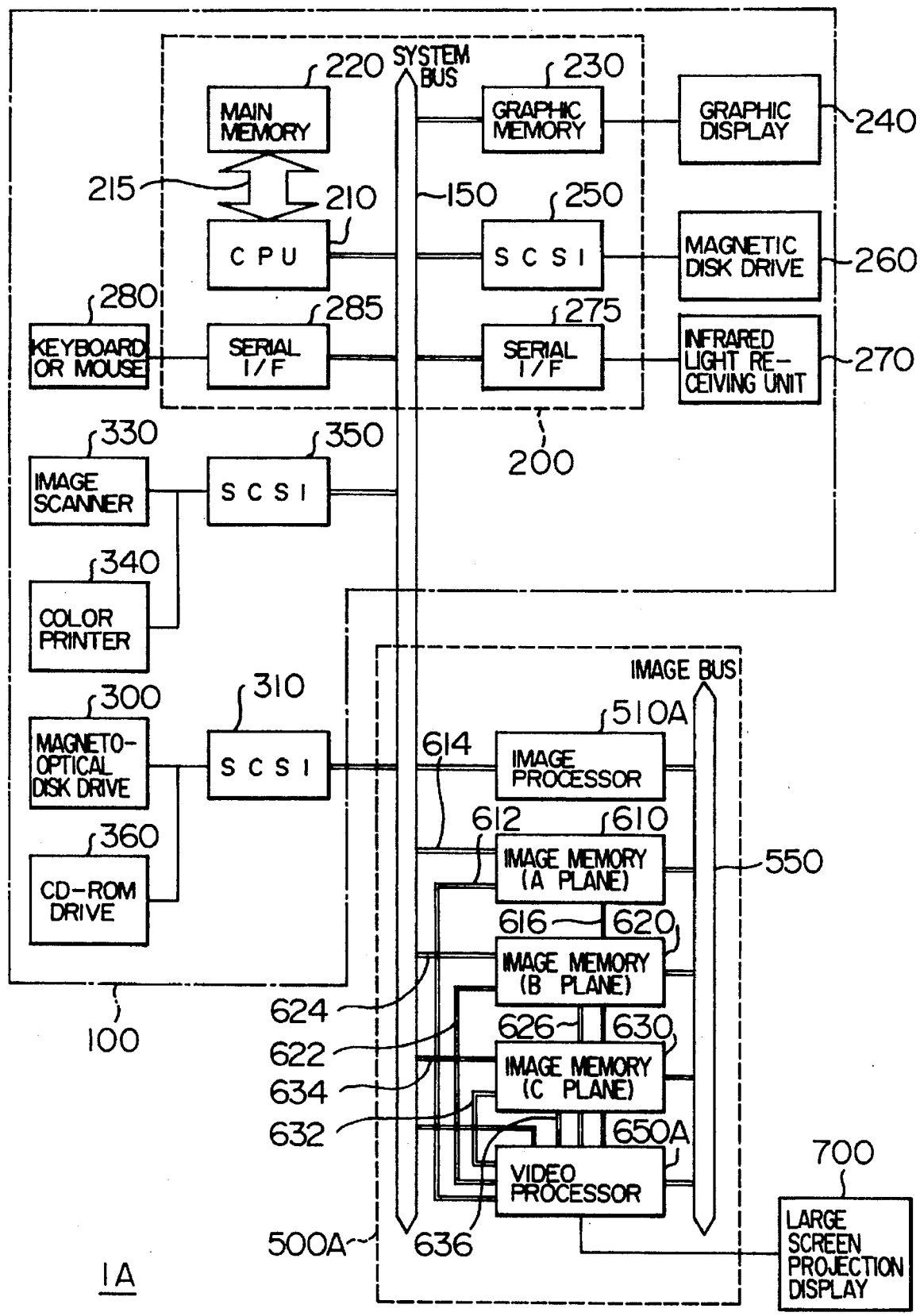
FIG. 6 is a block diagram showing a system construction of another embodiment of an image display apparatus of the invention.

FIG. 6 is a block diagram showing another embodiment of an image display apparatus of the invention.

An image display apparatus 1A differs from the image display apparatus 1 of FIG. 1 with respect to the following construction and effects.

(1) The compression/expansion unit 510 and image memory read/write controller 520 are replaced with a programmable image processor 510A. The video processor 650 is replaced with a programmable video processor 650A. Further, although the display addresses which are given to the image memories 610, 620, and 630 are supplied from the image memory read/write controller 520 via the signal lines 541, 542, and 543, they are supplied from the video processor 650A via signal lines 616, 626, and 636. Thus, by changing an image processing procedure of the image processor 510A by means of the CPU 210, a plurality of compressing/expanding operations of different processing algorithms can be executed or the image memory reading/writing processes can be dynamically changed.

(2) Signal lines 614, 624, and 634 for directly accessing from the system bus 150 are provided for the image memories 610, 620, and 630 so that the image memories are arranged in the same address space as that of the main memory 220. Thus, the image memories 610, 620, and 630 can be used from the CPU 210 in a manner similar to the case of the main memory 220. By virtue of this, the image data in each image memory can be directly changed. Further, a memory area in which no image data is stored can be used for other purposes.

Figure 7:
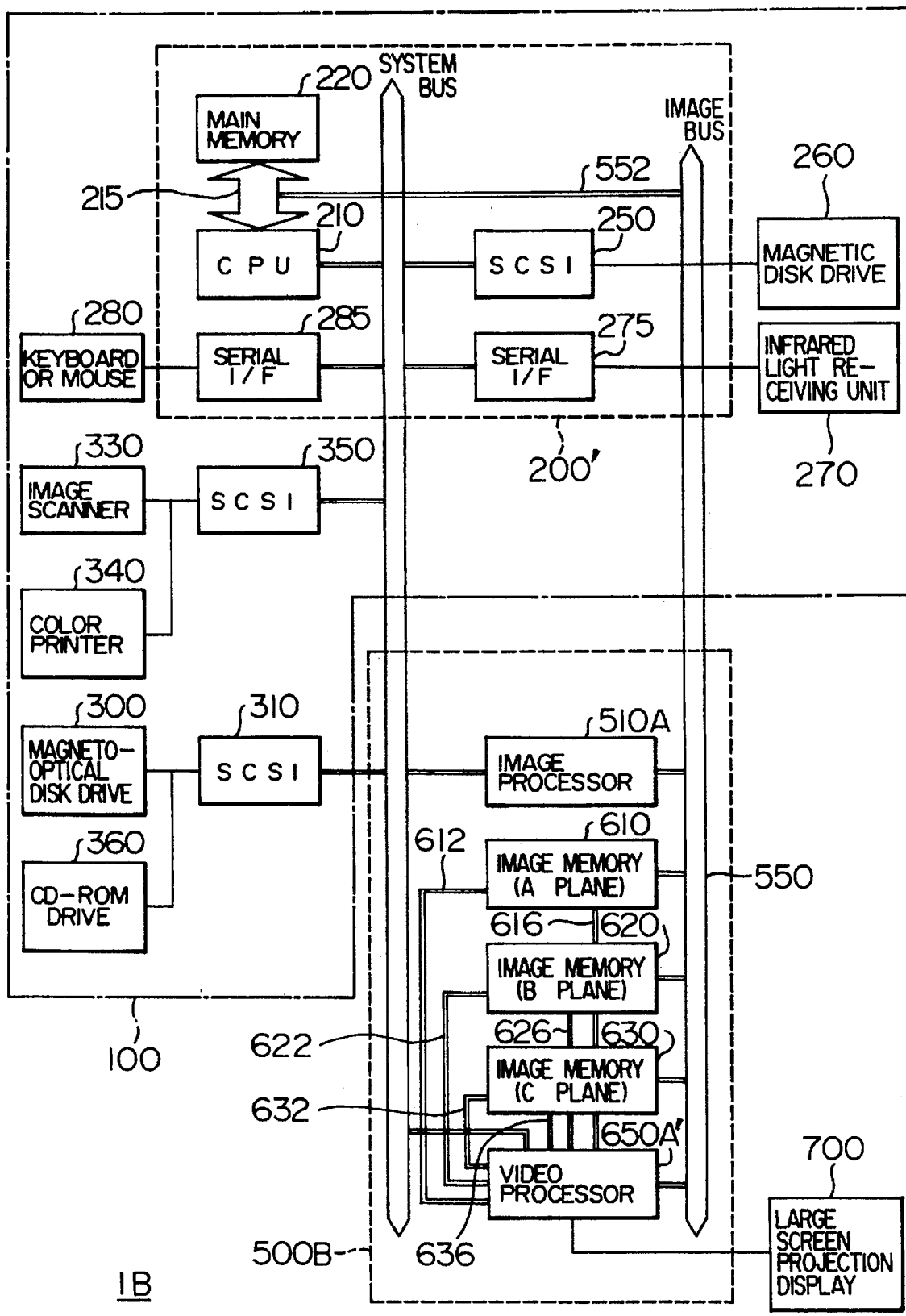
FIG. 7 is a block diagram showing a system construction of further another embodiment of an image display apparatus of the invention.

FIG. 7 is a block diagram showing still another embodiment of an image display apparatus of the invention.

An image display apparatus 1B differs from the image display apparatus 1 of FIG. 1 with respect to the following construction.

(1) A signal line 552 to connect a high-speed memory bus 215 which in turn connects the CPU 210 of the computer and the main memory 220 and the image bus 550 is provided. Since the signal line 552 and image bus 550 are also the high-speed lines, a signal transfer path of the memory bus 215, signal line 552, and image bus 550 has a high-speed data transfer rate as a whole.

(2) By commonly using the large screen projection display 700 as a graphic display, the graphic display 240 in FIGS. 1 and 6 is eliminated in a computer main body 200'. The function of the graphic display 240 is realized by the large screen projection display 700. A slave display plane of the graphic display 240 is displayed or the like in the display plane of the large screen projection display 700.

(3) In the embodiment of FIG. 1, the display addresses which are given to the image memories 610, 620, and 630 are supplied from the image memory read/write controller 520. In this embodiment, however, the display addresses are supplied from a video processor 650A' through the signal lines 616, 626, and 636. (Note that the video processor 650A' is connected to the memory bus 215 through the image bus 550 and signal line 552.) With the arrangement, the image memories can be arranged in the same address space as that of the main memory 220 of the computer.

By virtue of the above construction, in the case where the image memories are used as expansion memories of the main memory or the like, the high-speed access can be performed for the image memories. The displays can be centralized to one display, so that an operability of the user is improved and a cost-performance ratio is improved.

A method of using the image display apparatus of the invention will now be described with reference to FIGS. 1 and 3.

When the image processing Program is loaded into the computer main body 200', an initial display plane is displayed on the large screen projection display 700. Therefore, a resolution (for example, 1280×1024 dots) of the large screen projection display 700, whether the standard is an HVC (hi-vision promotion center) standard or not, auto-mode, interactive mode, and the like are designated by the operator.

First, the interactive mode will be described. When an interactive mode is designated on the initial display plane, menu display data 867 shown in FIG. 3 is read out from the magneto-optical disk loaded in the magneto-optical disk drive 300 and a menu is displayed on the large screen projection display 700.

From the above menu, an instruction is sent to the infrared light receiving unit 270 by means of a remote control unit (not shown) and a scenario to decide which one of the kinds such as Ukiyoe (a picture of everyday life in old Japan), landscape painting, ancient document, and the like is displayed is selected. By the above selection, the scenario data 866 is read out from the magneto-optical disk and the image data corresponding to the scenario data is stored in the image memories 610, 620, and 630. The image data is displayed to the large screen projection display 700 by the video processor 650. Simultaneously with the scenario selection, the audio data corresponding to the image data is read out from a CD-ROM set in the CD-ROM apparatus 360 and an audio sound is generated from a loud speaker (not shown) through an amplifier (not shown). One scenario has a plurality of image data and can sequentially switch and display the screen by the operation of a remote control unit.

The auto-mode will now be described.

When the auto-mode is selected on the initial display plane, the scenario data (control data) 866 is read out from the magneto-optical disk shown in FIG. 3 and the corresponding image data is stored in the image memories 610, 620, and 630 on the basis of the scenario data 866. The image data is displayed on the large screen projection display 700 by the video processor 650. Simultaneously with the scenario selection, the audio data corresponding to the image data is read out from the CD-ROM set in the CD-ROM apparatus 360 and an audio sound is generated from the loud speaker (not shown) through the amplifier (not shown). One scenario has a plurality of image data and can automatically sequentially switch and display the screen in accordance with a reproduction sequence of the scenario data.

In case of loading an ordinary application program without loading the image processing program into the computer main body 200, the image display apparatus 1B obviously operates as an ordinary PC basic system and the whole image memories can be used as expansion memories of the main memory 220.

When the image file 860 is created, the scenario data 866 is recorded on the magneto-optical disk together with the image data 861 to 865 as shown in FIG. 3.

As described in detail above, since the image bus as a dedicated bus which can transfer data at a high speed and, further, signal lines which can read out data from the image memories at a high speed are independently arranged on the system bus as a standard input/output bus of a PC basic system of a relatively slow data transfer speed, the image display apparatus of the invention has the following effects.

(1) The compressed image data and its expanded image data do not commonly use the system bus. The compressed image data uses the system bus, while the expanded image data uses the dedicated image bus. Therefore, a data transfer rate of the image display is improved and the processes can be executed at a high speed.

(2) Since a small computer such as a PC or the like and the image processor are installed in the same casing, a signal transfer delay can be reduced and the image display apparatus of a high cost-performance ratio can be obtained.

(3) Since the image memories can be used as expansion memories of the main memory of the small computer, the memory use efficiency is improved and the image display apparatus of a high cost-performance ratio can be obtained.

(4) The personal computer or the like as a general computer is used as a base machine of the image display apparatus and peripheral equipment such as magneto-optical disk drive, CD-ROM apparatus, image scanner, and the like are connected to the base machine side. Therefore, a creation and a change of a control software in the image processing unit which are usually required in association with the improvement of the performances of the peripheral equipment or the like, are unnecessary.

What is claimed is:

1. An image display apparatus comprising:

a computer including an input/output bus and a file apparatus which is connected to said input/output bus and in which at least compressed digital data on a plurality of images is recorded;

a decoding apparatus, connected to said input/output bus, for decoding the compression data outputted from said file apparatus to an original image;

image memories each for storing at least two display planes of the decoded images from said decoding apparatus;

a video processing apparatus for reading out said decoded images from said image memories and converting to a signal for display;

a display apparatus for displaying an output of said video processing apparatus as a color image;

a dedicated image data bus to which said decoding apparatus, said image memories, and said video processing apparatus are connected; and signal lines for connecting said image memories and said video processing apparatus, wherein said compression data from said file apparatus is transferred to said decoding apparatus through said input/output bus, said decoding apparatus transfers the expanded image data to said image memories through said dedicated image data bus, and said display data from said image memories is transferred to said video processing apparatus through said dedicated signal lines.

2. An apparatus according to claim 1, wherein said decoding apparatus includes a programmable image processor, said video processing apparatus includes a programmable video processor, and both of said processors operate under control of said computer.

3. An apparatus according to claim 2, wherein said image memories are used as expansion memories of a main memory of said computer.

4. An apparatus according to claim 3, further comprising buses for directly electrically connecting said input/output bus and said image memories, and wherein said image memories are arranged in a same address space as that of the main memory of said computer.

5. An apparatus according to claim 2, wherein said computer is an arbitrary one of a personal computer and a workstation.

6. An apparatus according to claim 2, wherein said image processor, said video processor, said image memories, and said video processing apparatus are installed in a same casing as said computer.

7. An apparatus according to claim 2, further comprising a reading apparatus, connected to said input/output bus, for reading out the image and converting the image to the image data, and wherein said image data from said reading apparatus is recorded into said file apparatus under control of said computer.

8. An apparatus according to claim 3, further comprising:

a signal line for connecting a memory bus of the main memory of said computer and said dedicated image data bus; and buses for connecting said video processor and said image memories, and wherein said image memories are arranged in a same address space as that of the main memory of said computer.

9. An apparatus according to claim 3, wherein said computer is an arbitrary one of a personal computer and a workstation.

10. An apparatus according to claim 3, wherein said decoding apparatus, said image memories, and said video processing apparatus are installed in a same casing as said computer.

11. An apparatus according to claim 3, further comprising a reading apparatus, connected to said input/output bus, for reading out the image and converting the image to the image data, and wherein said image data from said reading apparatus is recorded into said file apparatus under control of said computer.

12. An apparatus according to claim 1, wherein said file apparatus further records control data.

13. An apparatus according to claim 1, wherein said decoding apparatus, said image memories, and said video processing apparatus are installed in a same casing as said computer.

14. An apparatus according to claim 13, wherein said file apparatus further records audio data and control data.

15. An apparatus according to claim 1, wherein said image memories are used as expansion memories of a main memory of said computer.

16. An apparatus according to claim 15, further comprising buses for directly electrically connecting said input/output bus and said image memories, and wherein said image memories are arranged in a same address space as that of a main memory of said computer.

17. An apparatus according to claim 15, further comprising a signal line for connecting a memory bus of a main memory of said computer and said dedicated image data bus, and wherein said image memories are arranged in a same address space as that of the main memory of said computer.

18. An apparatus according to claim 1 wherein said computer is an arbitrary one of a personal computer and a workstation.

19. An apparatus according to claim 1, further comprising a reading apparatus, connected to said input/output bus, for reading out the image and converting the image to the image data, and wherein said image data from said reading apparatus is recorded into said file apparatus under control of said computer.

20. An apparatus according to claim 1, further comprising an image memory read/write controller connected to said input/output bus, said dedicated image data bus, and said image memory, and wherein said controller includes an address converter to use said image memories as expansion memories of a main memory of said computer.

21. An apparatus according the claim 1, wherein said file apparatus includes at least one of a magneto-optical disk drive, a CD-ROM drive and a magnetic disk drive.

22. An image display apparatus comprising:

a computer including an input/output bus and a file apparatus which is connected to said input/output bus and in which at least compressed digital data on a plurality of images is recorded;

a decoding apparatus, connected to said input/output bus, for decoding the compression data outputted from said file apparatus to an original image;

image memories each for storing at least two display planes of the decoded images from said decoding apparatus;

a video processing apparatus for reading out said decoded images from said image memories and converting to a signal for display;

a display apparatus for displaying an output of said video processing apparatus as a color image;

a dedicated image data bus to which said decoding apparatus, said image memories, and said video processing apparatus are connected; and signal lines for connecting said image memories and said video processing apparatus, wherein said compression data from said file apparatus is transferred to said decoding apparatus through said input/output bus, said decoding apparatus transfers the expanded image data to said image memories through said dedicated image data bus, and said display data from said image memories is transferred to said video processing apparatus through said dedicated signal lines, wherein said decoding apparatus includes a programmable image processor, said video processing apparatus includes a programmable video processor, and both of said processors operate under control of said computer.

23. An apparatus according to claim 22, wherein said image memories are used as expansion memories of a main memory of said computer.

24. An apparatus according to claim 23, further comprising buses for directly electrically connecting said input/output bus and said image memories, and wherein said image memories are arranged in a same address space as that of the main memory of said computer.

25. An apparatus according to claim 23, further comprising:

a signal line for connecting a memory bus of the main memory of said computer and said dedicated image data bus; and buses for connecting said video processor and said image memories, and wherein said image memories are arranged in a same address space as that of the main memory of said computer.

26. An apparatus according to claim 23, further comprising:

a signal line for connecting a memory bus of a main memory of said computer and said dedicated image data bus, and wherein said image memories are arranged in a same address space as that of the main memory of said computer.

27. An apparatus according to claim 23, wherein said computer is an arbitrary one of a personal computer and a workstation.

28. An apparatus according to claim 23, wherein said decoding apparatus, said image memories, and said video processing apparatus are installed in a same casing as said computer.

29. An apparatus according to claim 23, further comprising a reading apparatus, connected to said input/output bus, for reading out the image and converting the image to the image data, and wherein said image data from said reading apparatus is recorded into said file apparatus under control of said computer.

30. An apparatus according to claim 22, wherein said computer is an arbitrary one of a personal computer and a workstation.

31. An apparatus according to claim 22, wherein said decoding apparatus, said image memories, and said video processing apparatus are installed in a same casing as said computer.

32. An apparatus according to claim 31, wherein said file apparatus further records audio data and control data.

33. An apparatus according to claim 22, wherein said image processor, aid video processor, said image memories, and said video processing apparatus are installed in a same casing as said computer.

34. An apparatus according to claim 22, further comprising a reading apparatus, connected to said input/output bus, for reading out the image and converting the image to the image data, and wherein said image data from said reading apparatus is recorded into said file apparatus under control of said computer.

35. An apparatus according to claim 22, wherein said file apparatus further records control data.

36. An apparatus according to claim 22, further comprising an image memory read/write controller connected to said input/output bus, said dedicated image data bus, and said image memory, and wherein said controller includes an address converter to use said image memories as expansion memories of a main memory of said computer.

37. An apparatus according to claim 22, wherein said file apparatus includes at least one of a magneto-optical disk drive, a CD-ROM drive and a magnetic disk drive.

* * * * *